United States Patent [19]
Hattori

[11] 3,766,612
[45] Oct. 23, 1973

[54] SEAT BELT BUCKLE PROVIDED WITH A SWITCH MEANS
[75] Inventor: Hiroo Hattori, Oaza-Rokuwa, Japan
[73] Assignee: Kabushiki Kaisha Tokai Rika Denki Seisakusho, Aichi Prefecture, Japan
[22] Filed: May 2, 1972
[21] Appl. No.: 249,716

[52] U.S. Cl. ............ 24/230 A, 180/82 C, 340/52 E
[51] Int. Cl. .......................... A44b 11/25, B60q 1/00
[58] Field of Search .......................... 200/61.58 SB; 280/150 SB; 307/10 SB; 180/82 C; 340/278, 52 E; 24/230 A, 230 AS, 230 AV, 230 AL

[56] References Cited
UNITED STATES PATENTS
| 3,147,819 | 9/1964 | Keleher | 180/82 C |
| 3,624,601 | 11/1971 | Routzahn | 340/52 E |
| 3,686,720 | 8/1972 | Wehner | 24/230 A |

Primary Examiner—Donald A. Griffin
Attorney—Woodhams, Blanchard & Flynn

[57] ABSTRACT

A new and improved arrangement of a seat belt buckle mainly comprises a magnetic reed switch and a permanent magnet which are juxtaposed to each other in such a manner that the reed switch is subject to a magnetic field of the permanent magnet with a space provided therebetween. When, with this arrangement, the seat belt is attached to the vehicle occupant with a tongue plate thereof inserted into the space and automatically locked at the position by a locking means, the magnetic field established between the reed switch and the magnet is obstructed by the tongue plate situated therebetween so that the reed switch is actuated to open or close.

In particular, the buckle according to the present invention may be arranged to dispose the reed switch in a circuit of any electrically constructed apparatus such as an acceleration switch.

1 Claim, 3 Drawing Figures

PATENTED OCT 23 1973　　　　　　　　　　　3,766,612
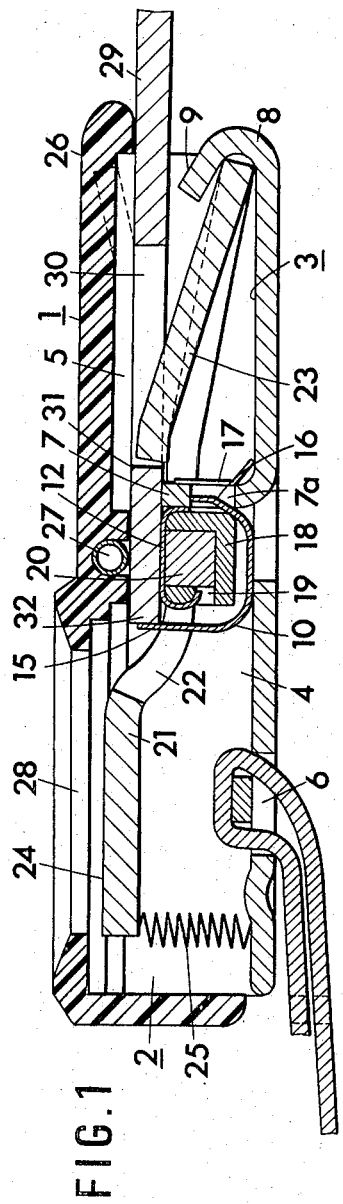
FIG.1
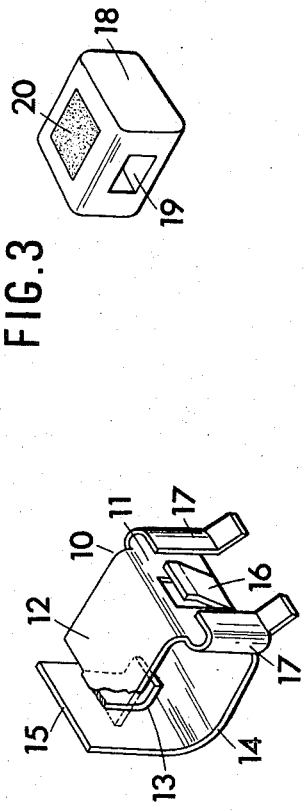
FIG.3
FIG.2

SEAT BELT BUCKLE PROVIDED WITH A SWITCH MEANS

The present invention generally relates to a seat belt buckle for use in a motor vehicle and, more particularly, to a seat belt buckle provided with a switch element arranged to be opened or closed upon attachment or detachment of the seat belt to and from a vehicle occupant.

The buckle according to the invention accomplishes a unique construction generally including a magnetic reed switch and a permanent magnet which are juxtaposed to each other with a space to receive a tongue plate of the seat belt therebetween, the reed switch thus being subjected to a magnetic field of the permanent magnet. A locking means is also provided in the buckle arrangement in such a manner that a tongue plate of the seat belt is automatically locked when inserted into said elogated space. When, thus, a tongue plate is inserted into the space defined between the reed switch and the magnet and automatically locked by the locking means at the position, the magnetic field of the magnet is interrupted by the tongue plate with the result that the magnetic reed switch is caused to open or close.

If, in this instance, the reed switch is disposed in a desired circuit of such an electrically arranged apparatus as an acceleration switch, the apparatus is to be advantageously brought into an operative condition simultaneously with actuation of the reed switch and, thus, in accordance precisely with attachment of the safety seat belt.

It is, therefore, an object of the present invention to provide a new and improved arrangement of a seat belt buckle for use in a motor vehicle.

It is another object of the present invention to provide the seat belt buckle of the type described with a magnetic reed switch which is arranged to be opened or closed in accordance with attachment and detachment of the seat belt to and from the vehicle occupant.

It is a further object of the present invention to provide the seat belt buckle of the type described with a permanent magnet which is juxtaposed to the magnetic reed switch to control operations thereof with the reed switch subjected to a magnetic field thereof.

It is a still further object of the present invention to provide the seat belt buckle of the type described in which the magnetic field established between the reed switch and the magnet is obstructed by a tongue plate of the seat belt inserted into the space between the switch and the magnet in the event the seat belt is attached to the vehicle occupant.

It is an additional object of the present invention to provide the seat belt buckle of the type described with a locking means adapted to lock the tongue plate of the seat belt at a position between the reed switch and the magnet.

Essentially, according to this invention, there is provided a seat belt buckle for use in a motor vehicle, comprising a magnetic reed switch disposed in a circuit of electrically arranged apparatus; a permanent magnet juxtaposed to said magnetic reed switch with a space defined therebetween, a tongue plate of the seat belt being adapted to be inserted into said space; and a locking means to automatically lock said tongue plate in said space; whereby in accordance with attachment of the seat belt to a vehicle occupant, a magnetic field established between said magnetic reed switch and permanent magnet is obstructed by said tongue plate and said reed switch is opened or closed to actuate the electrically arranged apparatus.

The present invention, both as to its construction and manner of operation, together with further objects and advantages thereof, may best be understood with reference to the following description, taken in connection with the accompanying drawings in which:

FIG. 1 is a sectional side elevational view showing a seat belt buckle according to this invention;

FIG. 2 is a perspective view illustrating, in detail, a construction of a support member for supporting a permanent magnet encased in a casing; and FIG. 3 is a perspective view of the casing encasing the permanent magnet.

Referring now to FIG. 1, there is shown a preferred embodiment of the seat belt buckle according to the present invention in sectional side elevation, in which a reference numeral 1 designates a buckle body. A main structure 2 of the buckle body 1 is substantially ⊔-shaped in its cross section and consists of a bottom wall portion 3, side wall portions 4 disposed to both sides of the bottom portion 3 and flange-like internally and horrizontally extending bent end portions 5 formed at the upper ends of the side walls 4, all of which are integrally constructed. In the bottom portion 3 is formed an opening 6 along the width thereof. The bottom portion 3 is further provided with an upwardly bent plate member 7 having an opening 7a and forming a space for receiving a tongue plate 29 between the upper marginal surface thereof and the lower surfaces of the bent end portions 5. The bottom portion 3 is bent at its rearward portion to form a curved portion 8 of a vertical sectional ⊃-shape. Thus, as shown, an opening 9 is defined between the upper peripheral surface of the curved portion 8 of the body portion 3 and the lower peripheral surface of the end portion 5.

The main structure 2 of the buckle body further comprises a support member 10 designed to support a permanent magnet encased in a casing and preferably made of a leaf spring. The support member will be seen in more detail with reference to FIG. 2. As shown, the support member 10 integrally consists of an upright portion 11, an upper portion 12 forwardly extending from the upper edge of the upright portion 11, an extension 13 downwardly extending from the forward end of the upper portion 12, a lower portion 14 forwardly extending from the lower edge of the upright portion 11 and a resilient stop portion 15 upwardly extending from the forward edge of the lower portion 14. The upright portion 11 is further provided with a coupling piece 16 and resilient portions 17 bent with their marginal ends facing with each other.

Illustrated in detail in FIG. 3 is a roofless casing 18 for retaining therein a permanent magnet 20. The casing 18 comprises in the forward face a cut-out portion 19 engageable with the extension 13. The permanent magnet is encased in the casing 18 in such a manner as shown in the drawing.

In regard now to the arrangement of the casing 18 and the support member 10, the casing 18 encasing the magnet is first so placed under the upper portion 12 of the support member 10 as to be secured between the extension 13 engaged with the cut-out portion 19 and the upright portion 11. The resilient bent portions 17 of the support member 10 are then fitted over the plate member 7 from the top to embrace the same therebetween, while the coupling piece 16 is brought to be fixed in the opening 7a formed in the plate member 7 as shown in FIG. 1. It is to be understood, in this instance, that the support member 10 is thus prevented from being disengaged from the plate member 7, closely fitted thereto.

It should be noted that the height of the upper portion 12 of the support member 10 is thus brought into an alignment with that of the marginal end surface of the plate member 7 while the stop portion 15 is allowed to upwardly extend relatively higher than the upper portion 12.

The seat belt buckle according to the present invention further includes a locking means composed mainly of a locking plate 21 and a locking member 23. As seen in FIG. 1, the locking plate 21 is fitted at its rearward end portion in the curved portion 8 of the bottom portion 3 so as to overlie the bottom portion 3. In the locking plate 21 is formed an opening 22 in which the upright portion of the plate member 7 is loosely positioned together with the support member 10. The locking plate 21 further comprises a locking projection 23 which is formed upwardly pushed out at an inclined portion of the locking plate, that is, between the rear end fitted in the curved portion 8 and the rear edge of the opening 22 and still further a horizontally extending forward portion 24 allowed to be pressed down by a finger. A spring means 25 is adapted to continuously bias the locking plate 21 so that the horizontally extending forward portion 24 of the locking plate 21 is upwardly urged.

A covering member 26 is further provided to the buckle body to cover the upper face and the forward end of the main structure 2. A magnetic reed switch 27 is incorporated in the lower periphery of the covering member 26 at a corresponding position to the magnet 20 with a space from the support member 10 to receive the tongue plate 29. In said covering means 26 is formed an opening 28 through which the forward portion 24 of the locking plate is pressed down against the biasing force of the spring means 25. The tongue plate 29 of the seat belt has an opening 30 with which the locking member 23 of the locking plate 21 is engaged by abutting its forward end on a forward inner peripheral wall 31 of the opening 30. Indicated by reference numeral 32 is a forward end portion of the tongue plate 29.

When, with this arrangement, a seat belt enfolded in a suitable enfolding means is pulled out and the tongue plate 29 is appropriately inserted into the buckle body through the opening 9, the forward end portion 32 of the tongue plate is initially brought into contact with the upper surface of the locking member 23 so that the locking plate 21 is depressed instanteneously. As, however, the portion 32 is inserted to abut on the resilient stop portion 15 of the support member 10, the locking member 23 is again urged upwardly and, thus, fitted into the opening 30 as indicated in FIG. 1. As a result, the tongue plate 29 is caused to be automatically locked at the position with the inner wall 31 of the opening 30 brought into engagement with the locking member 23.

Since, under the condition described in the above, the portion 32 of thee tongue plate 29 is interposed between the magnetic reed switch 27 and the permanent magnet 20 which are facing each other, the magnetic field of the magnet 20 is obstructed by the tongue plate from being applied to the magnetic reed switch. If, therefore, the reed switch 27 is prearranged to be kept open while the tongue plate 29 is not inserted into the buckle body to interfere the magnetic field, the reed switch is caused to close in accordance with insertion of the tongue plate or vice versa.

It will now be clearly understood from the foregoing description that the buckle arrangement according to the present invention is advantageously capable of opening and closing the magnetic reed switch with an utmost precision in accordance with insertion and lock of the tongue plate or pulling out of the same. It has a further advantage that any desired electrically arranged apparatus such as an acceleration switch may include the reed switch in the circuit thereof so as to perform required operations simultaneously with the attachment and detachment of the safety seat belt to and from the operator of the motor vehicle.

It should be further noted that, since the buckle according to the invention is quite simple in construction, an acceptable production cost will be realized.

While a particular embodiment of the present invention has been shown and described, it will be obvious to those skilled in the art that a variety of changes and modifications may be made without departing from its invention in this broader aspects.

What is claimed is:

1. A seat belt buckle for use in a motor vehicle, comprising a magnetic reed switch disposed in a circuit of electrically arranged apparatus; a permanent magnet juxtaposed to said magnetic reed switch with a space defined therebetween, a tongue plate of the seat belt being adapted to be inserted into said space; and a locking means to automatically lock said tongue plate in said space; whereby in accordance with attachment of the seat belt to a vehicle occupant, a magnetic field established between said magnetic reed switch and permanent magnet is obstructed by said tongue plate and said reed switch is opened or closed to actuate the electrically arranged apparatus.

* * * * *